(12) United States Patent
Minter et al.

(10) Patent No.: US 6,407,703 B1
(45) Date of Patent: Jun. 18, 2002

(54) MULTI-PLATFORM GEOLOCATION METHOD AND SYSTEM

(75) Inventors: Thomas C. Minter, Lone Tree; Robert S. Reichert, Littleton; Richard A. Kallaus, Colorado Springs, all of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/633,382

(22) Filed: Aug. 7, 2000

(51) Int. Cl.⁷ .................................................. G01S 3/02
(52) U.S. Cl. ...................................... 342/450; 342/465
(58) Field of Search ............................... 342/450, 457, 342/462, 465

(56) References Cited

U.S. PATENT DOCUMENTS

| | | | |
|---|---|---|---|
| 5,063,385 A | 11/1991 | Caschera | 342/13 |
| 5,285,209 A | 2/1994 | Sharpin et al. | 342/424 |
| 5,444,451 A | 8/1995 | Johnson et al. | 342/453 |
| 5,526,001 A | 6/1996 | Rose et al. | 342/442 |
| 5,629,707 A | 5/1997 | Heuvel et al. | 342/357 |
| 5,724,047 A | 3/1998 | Lioio et al. | 342/442 |
| 5,890,068 A | 3/1999 | Fattouche et al. | 455/456 |
| 5,914,687 A | 6/1999 | Rose | 342/442 |
| 5,926,133 A | 7/1999 | Green, Jr. | 342/363 |
| 5,973,643 A | 10/1999 | Hawkes et al. | 342/457 |
| 5,999,124 A | 12/1999 | Sheynblat | 342/357.09 |
| 5,999,129 A | 12/1999 | Rose | 342/394 |
| 5,999,131 A | 12/1999 | Sullivan | 342/465 |

*Primary Examiner*—Theodore M. Blum
(74) *Attorney, Agent, or Firm*—Marsh Fischmann & Breyfogle LLP (57) ABSTRACT

A method for determining the geolocation of an emitter using sensors located at a single or multiple platforms is disclosed. Generally, the method includes the steps of receiving a first measurement set relative to a first emitter, the first measurement set including angle of arrival, time difference of arrival and/or terrain height/altitude measurements, receiving a first location guess or estimate for the first emitter, and determining at least a second location estimate using at least one of a batch least squares analysis and a Kalman filter analysis.

20 Claims, 10 Drawing Sheets

FIG.1

THREE-PLATFORM AOA/TDOA/ALTITUDE GEOLOCATION

FIG.2

MULTIPLE INTERCEPT PRECISION
TWO-PLATFORM
AOA/TDOA/ALTITUDE GEOLOCATION

FIG.3A

SINGLE INTERCEPT TWO-PLATFORM
AOA/TDOA/ALTITUDE GEOLOCATION

MULTI-PLATFORM GEOLOCATION METHOD AND SYSTEM

FIELD OF THE INVENTION

The present generally relates to the method and system for locating a source of electromagnetic radiation, and in particular, a system and method for processing angle of arrival, time difference of arrival, and/or terrain altitude measurements to determine a location of an emitter (e.g., radio or microwave).

BACKGROUND OF THE INVENTION

Various methodologies and techniques have been developed over the years for the purpose of locating or determining the geolocation of radio frequency transmitters or emitters. And, in order to meet the requirements of a recent Federal Communications Commission (FCC) Ruling and Order, whereby cellular the phone service providers in the United States must provide a capability to locate the position of a cellular phone making an emergency call within the cellular phone service provider's system to within 125 meters with about a 67% probability, new techniques and methodologies have been developed to increase location accuracy in order to meet the requirements of this FCC Ruling and Order. U.S. Pat. No. 5,987,329 entitled "System and Method for Mobile Telephone Location Measurement Using a Hybrid Technique" outlines a number of techniques that have been developed and that are currently being developed to meet the FCC's Ruling and Order, among other requirements. However, and as noted in U.S. Pat. No. 5,987,329, except for the Global Positioning System (GPS), most current location measurement techniques and approaches do not meet the FCC mandate.

SUMMARY OF THE INVENTION

It is therefore an object of the present invention to provide a system and methodology for determining the geolocation of a source of electromagnetic radiation or an emitter with increased accuracy over conventional systems and methodologies.

It is a further object of the present invention to provide a system and method for providing geolocation information of an emitter with an estimate of the accuracy of such geolocation determination.

It is still another object of the present invention to provide a geolocation system and methodology capable of estimating and removing time difference of arrival ("TDOA") biases from certain measurements.

The method and system of the present invention achieves one or more of these objectives by providing a method and system which utilizes measurements taken from several different locations simultaneously. Such measurements may include angle of arrival measurements, relative time of arrival of pulses at two or more locations, and terrain altitude estimate information for the emitter. The system and method of the present invention is also adapted to provide location uncertainty information, accounting for both random noise and bias sources. In one embodiment, the method for locating the first emitter includes the steps of receiving at first and second platforms a first signal (e.g., a pulse or a continuous wave) emitted from the first emitter, determining a first angle of arrival and/or a first time of arrival of the first signal at the first platform, determining a second angle of arrival and/or a second time of arrival of the first signal at the second platform, receiving a first altitude estimate of the first emitter, and determining a first location estimate of the first emitter using the first angle of arrival and/or the first time of arrival of the first signal at the first platform, the second angle of arrival and/or the second time of arrival of the first signal at the second platform, and the first altitude estimate of the first emitter. The first altitude estimate may be independent of the first and second angles of arrival at the first and second platforms, respectively, and may be retrieved from a database containing terrain information in the area where the first emitter is estimated to be located. In another embodiment, the step of determining the first location estimate includes performing a least squares analysis and/or a Kalman filter analysis using the first and second angles of arrival of the first signal at the first and second platforms, respectively, the first and second times of arrival of the first signal at the first and second platforms, and/or the first altitude estimate of the first emitter.

In another embodiment, the method may further include the step of receiving an initial location estimate for the first emitter. Such initial location estimate may be obtained from available information sources (e.g., a database) or may be determined in a number of ways. In this regard, the step of receiving the initial location estimate may comprise performing one of the steps of determining the initial location estimate from a first intersection of the first and second angles of arrival of the first signal at the first and second platform, respectively, the first platform being remote from the second platform, determining the initial location estimate from a second intersection of the first angle of arrival and a third angle of arrival of the first signal at the first platform and a third platform, respectively, the first platform being remote from the third platform, and determining the initial location estimate from a third intersection of the third angle of arrival and a fourth angle of arrival of the first signal at the third platform and a fourth platform, respectively, the third platform being remote from the fourth platform. Alternatively, the initial location estimate can be determined from a first intersection of the first angle of arrival of the first signal and second angle of arrival of a second signal at the first platform at another point in time if the first platform is moving. In this regard, the initial location estimate or guess may be performed by finding the intersection of angle of arrival measurements from at least two geometrically separated platforms or sensors for receiving signals from the emitter, or one platform or sensor which moves between two different times. In another embodiment, the initial location estimate may be determined by a first intersection of a first pointing direction with a ground surface, the first pointing direction corresponding to a first azimuth and first elevation of the first angle of arrival of the first signal at the first platform, or from a second intersection of a second pointing direction with the ground surface, the second pointing direction corresponding to a first azimuth and a first elevation of a third angle of arrival of the first signal at a third platform.

In another embodiment, an expected measurement set can be determined from the known positions of the platforms (e.g., first and second platforms), and the initial location estimate. In this regard, an expected TDOA measurement may be obtained. A difference or residual between each actual measurement set (e.g., angle of arrival, time difference of arrival and/or altitude estimate) and the predicted or expected measurement set will, in general, exist. This residual arises from error in the initial location estimate and measurement noise. The method of the present invention uses this residual or difference between the actual measurements and the predicted measurements to update the initial location estimate such that the expected measurement set has optimal agreement with the actual measurement sets.

DETAILED DESCRIPTION

FIGS. 1–7B illustrate various embodiments of the method of the present invention for locating an emitter. More specifically, the present invention is directed to a method for precisely locating an electromagnetic emitter, such as a radar or cellular telephone, using passive measurements on the electromagnetic waves or pulses from the emitter by taking certain measurements at several different locations. According to the method of the present invention, the measurements used for determining emitter geolocation are the angle of arrival, the relative time of arrival of pulses at two or more platform or sensor locations (e.g., stationary or moving platforms, such as land-based stations, land-based vehicles, aircraft, spacecraft and/or ship-based systems), and/or terrain altitude information.

Figure 1:
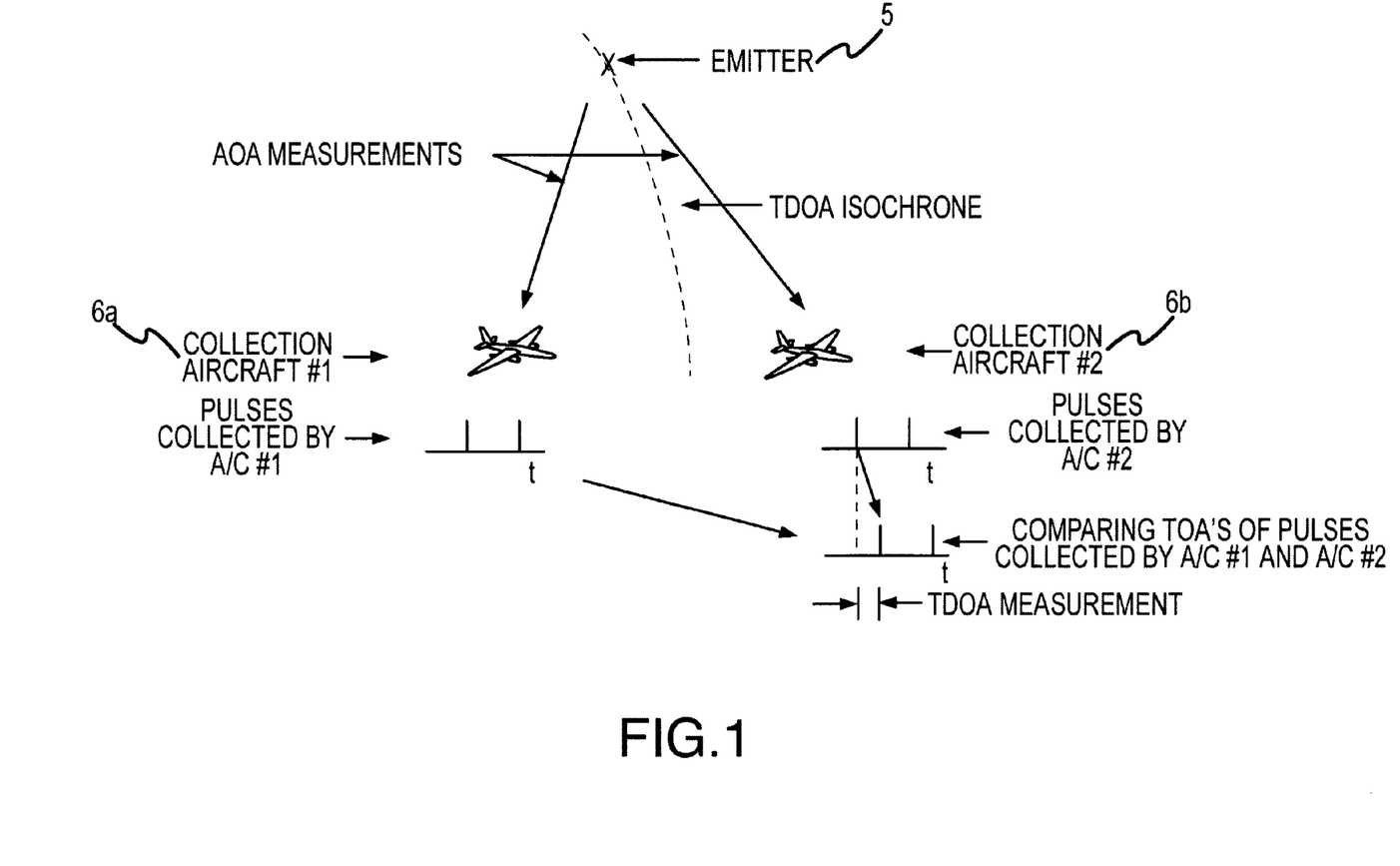
FIG. 1 illustrates one embodiment of the process for obtaining AOA, TDOA and/or altitude measurements using a single signal intercept at two platforms.
Figure 2:
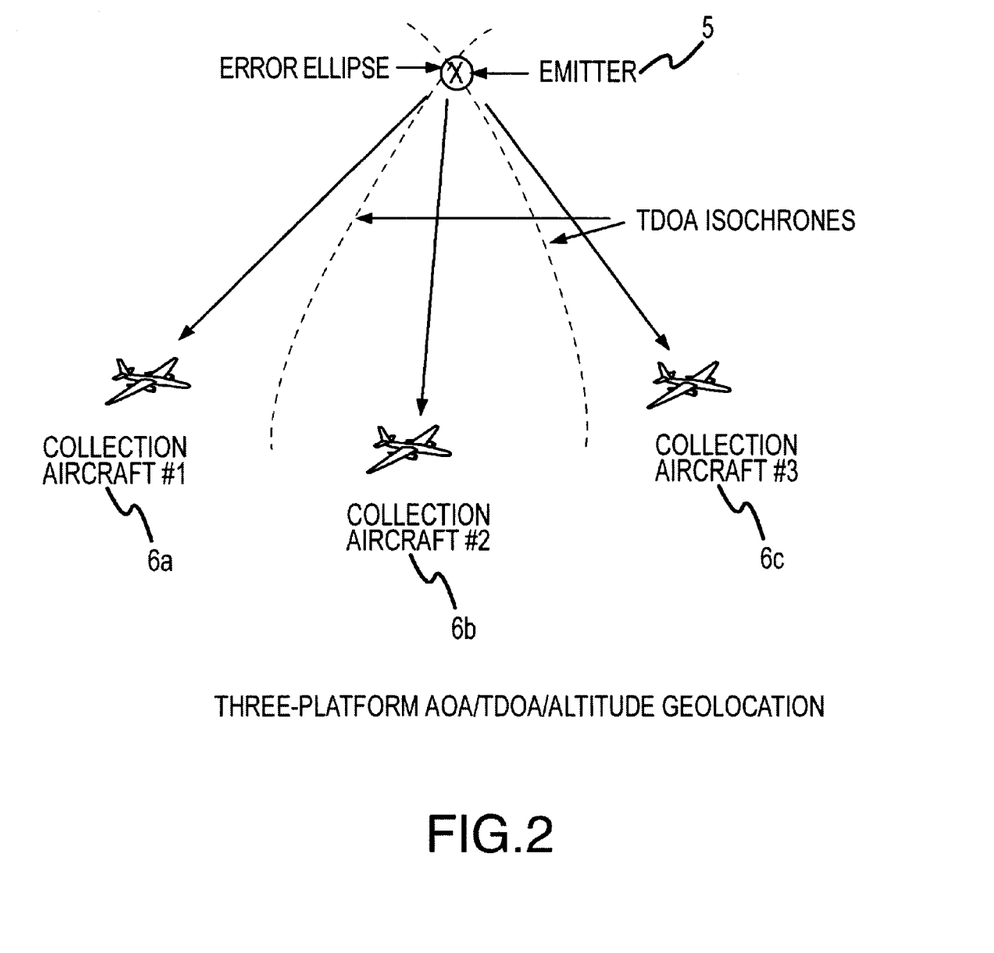
FIG. 2 illustrates another embodiment of the process for collecting AOA, TDOA and/or altitude measurements using a single signal intercept at multiple (e.g., at least three) platforms.
Figure 3A:
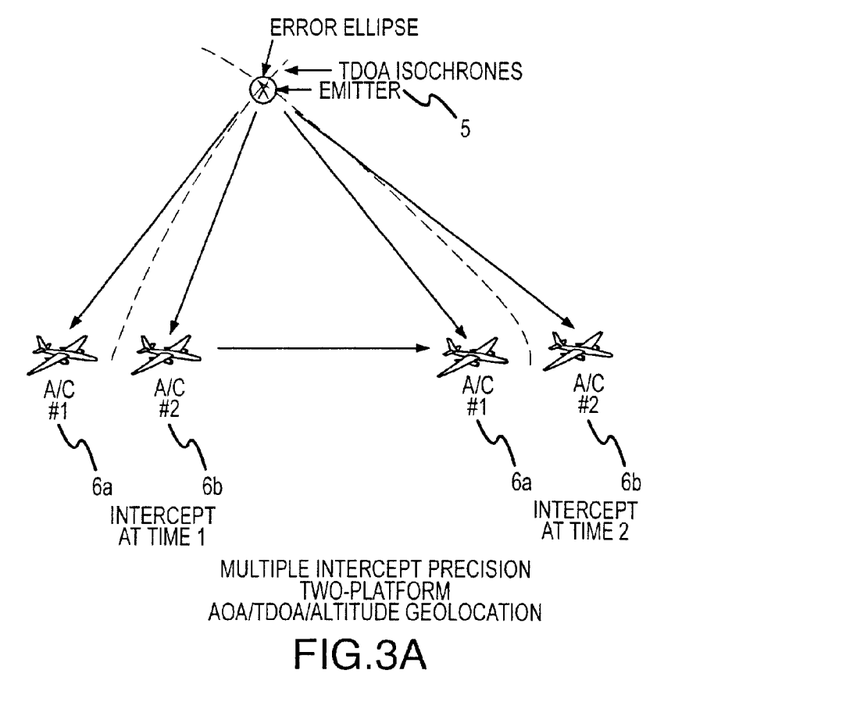
FIGS. 3A–3B illustrate another embodiment for obtaining AOA, TDOA and/or altitude measurements from multiple intercepts at two platforms.
Figure 3B:
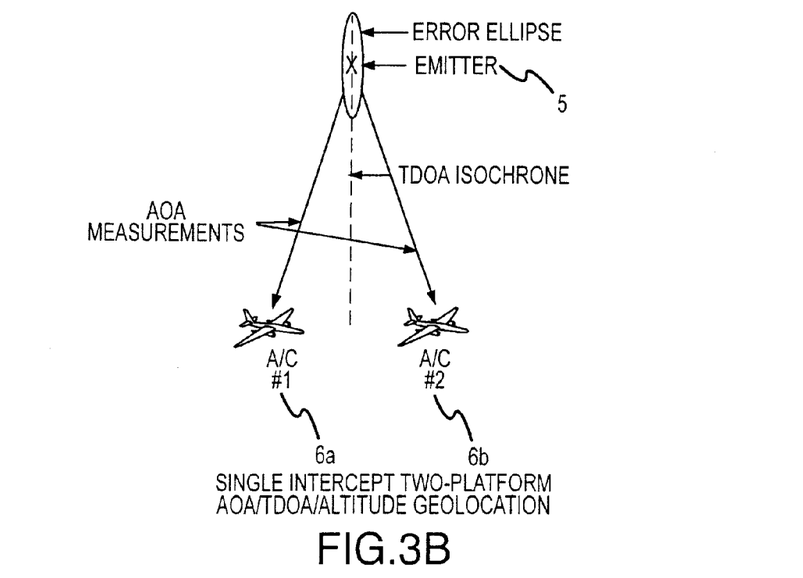

Generally, the measurements obtained for a given emitter of interest to determine the geolocation for the given emitter are angle of arrival ("AOA") measurements provided by an interferometer or other direction finding receiver on a collection platform, the time difference of arrival of pulses provided by differencing the relative times of arrivals at at least two spatially separated receivers having accurate time measurement capability from, for example, the Global Positioning Satellite System, and terrain altitude information corresponding to the emitter's location. FIG. 1 generally illustrates a process for obtaining such measurements for a given emitter 5, whereby collection platforms (e.g., space, air or ground-based collection sensors) 6a, 6b are adapted to collect a signal from the emitter 5 to provide AOA and TDOA measurements and/or altitude measurements. FIG. 2 generally illustrates a process whereby three platforms 6a, 6b, 6c are utilized to collect AOA, TDOA and/or altitude measurements from the emitter 5 using a single signal intercept. FIGS. 3A–3B illustrate the processes for obtaining AOA, TDOA and/or altitude measurements with two platforms 6a, 6b, to collect measurements from the emitter 5 from multiple intercepts. Such terrain altitude information for the emitter may be obtained via a table lookup of the terrain altitude at the emitter's general area or location from the Defense Mapping Agency's Digital Terrain Elevation Database ("DTED"). Such terrain altitude information can also be in the form of summary statistics for an area or a country (e.g., the average terrain altitude in a country or area of interest and the range of terrain altitude in the country). Utilization of such terrain altitude information may significantly enhance the accuracy of the geolocation estimate of an emitter.

Figure 4:
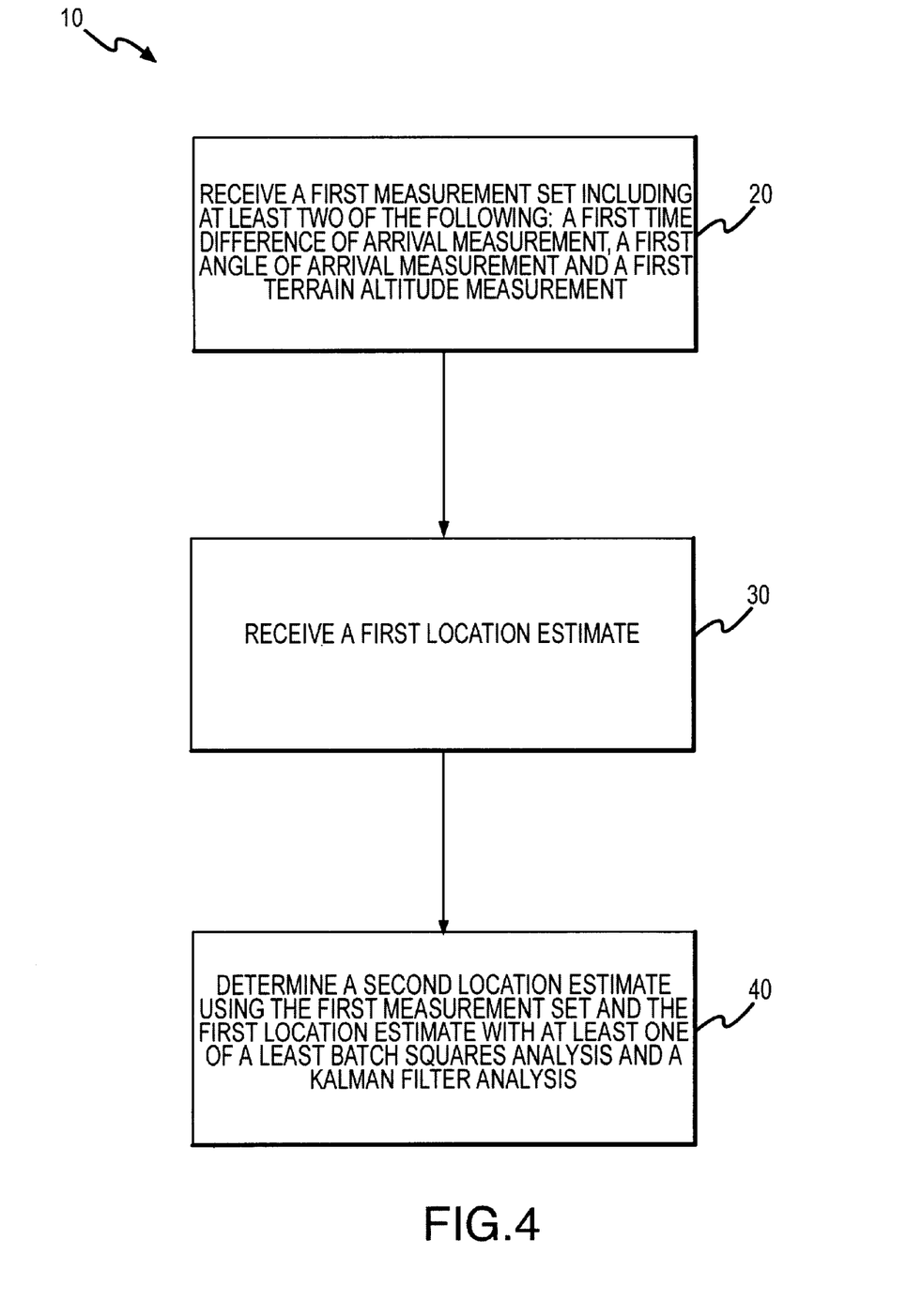
FIG. 4 is a flow chart of one embodiment of the method of the present invention.

Referring to FIG. 4, the method 10 of the present invention generally includes the step 20 of receiving a first measurement set which includes at least two of the following items: a first angle of arrival measurement (i.e., including azimuth and elevation measurements), a first time difference of arrival measurement and/or a first terrain altitude measurement corresponding to the first emitter. The method further includes the step 30 of receiving a first location estimate for the first emitter, and the step 40 of determining at least a second location estimate using the first measurement set and the first location estimate by performing a least squares analysis and/or a Kalman filter analysis. As noted in FIG. 1, the method 10 includes a step 30 of receiving a first location estimate or initial location guess. Such first location estimate may be determined by calculating the intersection of angle of arrival measurements from at least two geometrically separated sensors or platforms receiving a first signal from the first emitter, or, alternatively, from one sensor or platform which moves between two different times or one sensor at one position at one time which measures both azimuth angle of arrival and elevation angle of arrival. In this regard, the first location estimate may be determined by utilizing such angle of arrival information and terrain altitude information.

Figure 5:
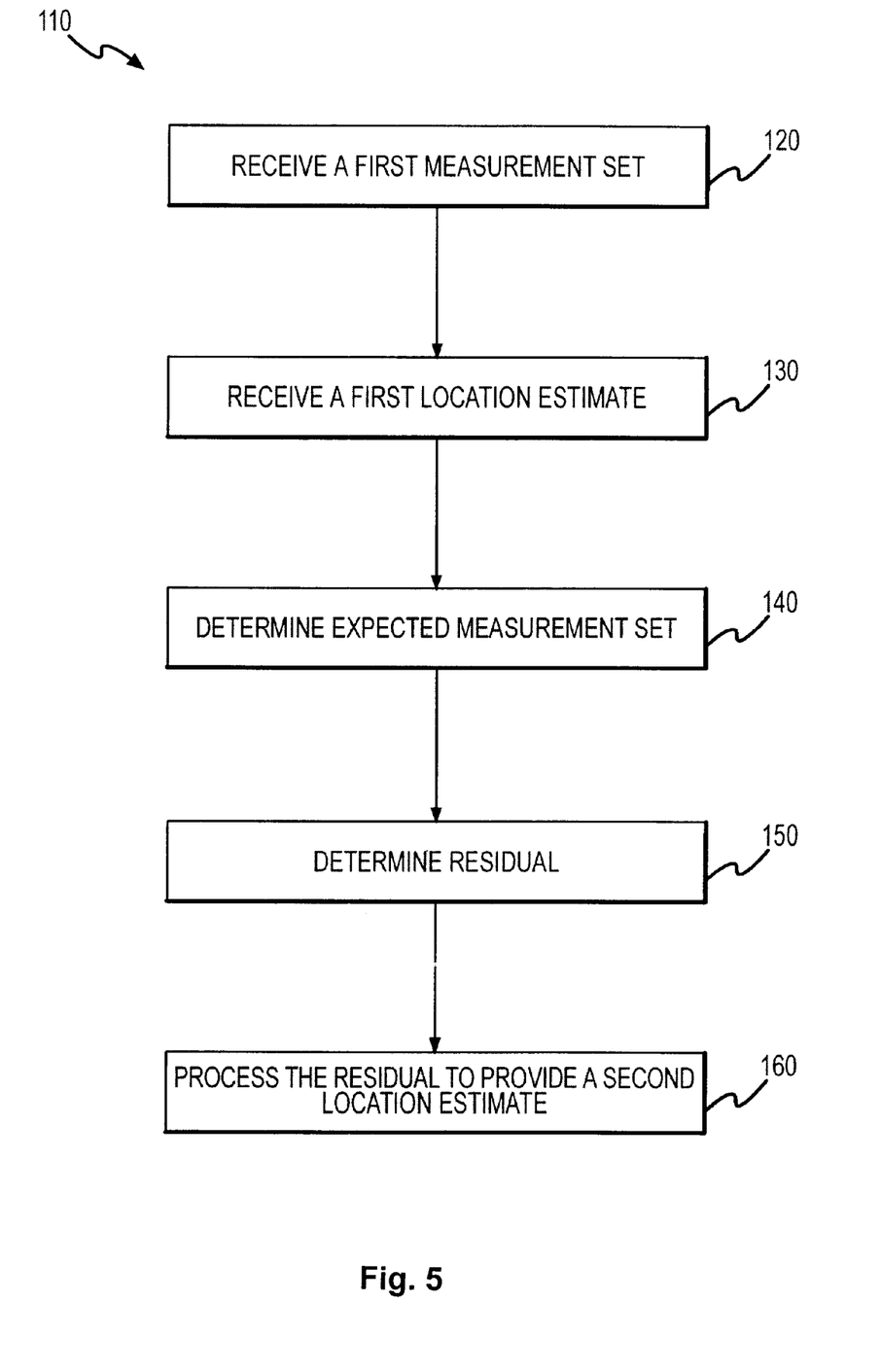
FIG. 5 is a flow chart of another embodiment of the method of the present invention.

More specifically, and referring to FIG. 5, in one embodiment, the method 110 for determining the location of a first emitter includes the step 120 of receiving a first measurement set, the first measurement set including angle of arrival, time difference of arrival, and/or altitude measurements taken at several known sensor positions. The method 110 further includes the step 130 of receiving an initial location guess or estimate for the first emitter. From the sensor positions and the initial location guess (e.g., first location estimate), an expected measurement set can be determined at step 140. For example, given a range from each sensor or platform to the first location estimate, a propagation time may be determined to each platform or sensor using the speed of light, and an expected TDOA may be obtained. In general, there is difference or residual between each actual measurement set and the predicted or expected measurement set, and such residual may be determined at step 150. This arises from error in the initial or first location estimate and measurement noise. As such, the step 160 includes using this residual or difference to update the first location estimate or guess such that the expected measurement set has optimal agreement with the actual measurement sets.

The method of the present invention is also adapted to estimate and remove biases from the TDOA measurements caused by clock offset and sensor group delay errors left over after calibration. Removing these biases by including them in the state solution significantly enhances the accuracy of the location estimate. The method is also adapted to estimate the errors in the location estimate based on knowledge of the accuracy of the passive measurements (e.g., TDOA and AOA bias and noise errors, arising from clock errors, sensor boresight erros, respectively, and error in terrain altitude), and platform position (e.g., on board which are the sensors for receiving the electromagnetic waves or pulses from the first emitter).

Figure 6A:
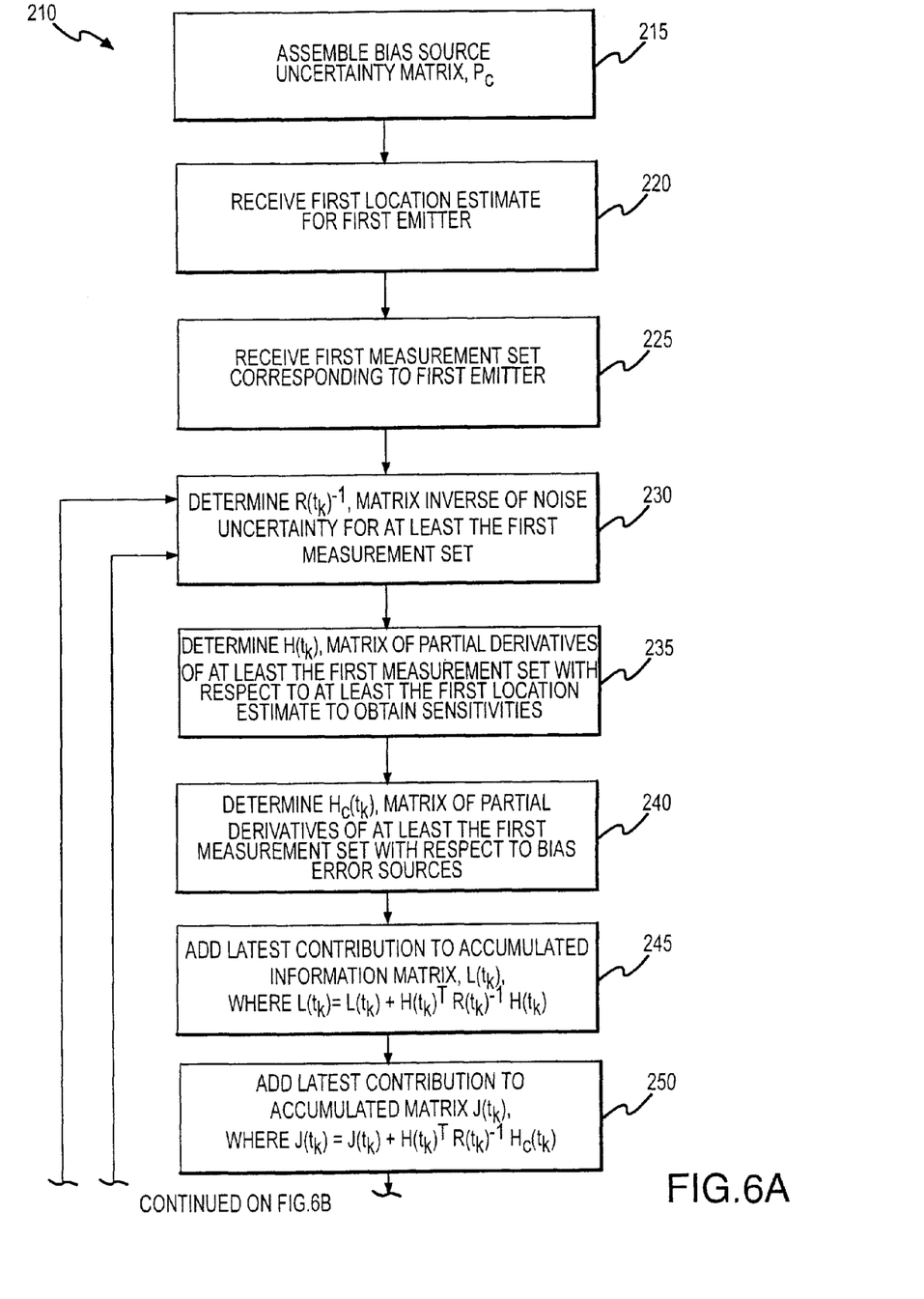
FIGS. 6A–6C illustrate yet another embodiment of the method of the present invention.
Figure 6B:
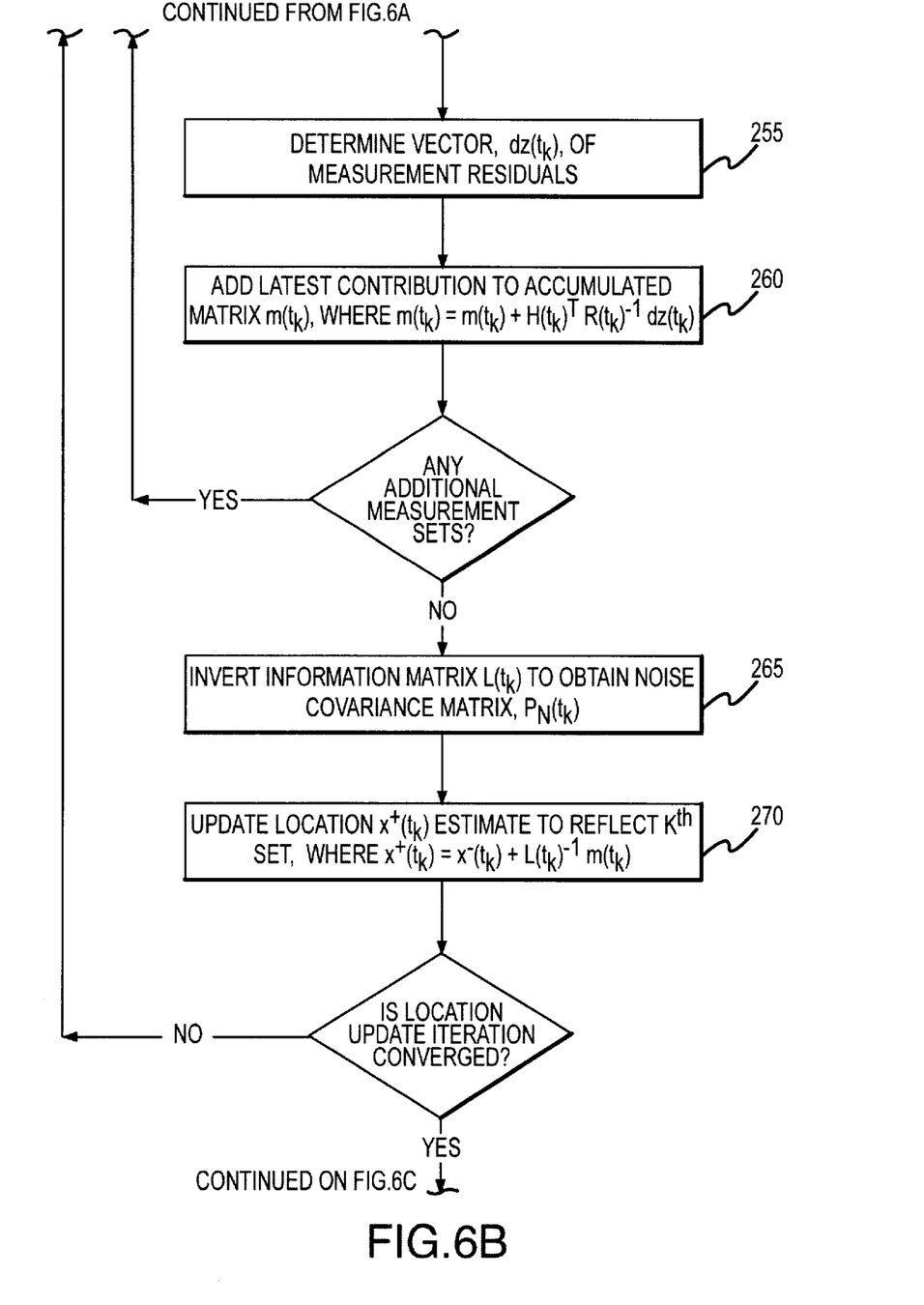
Figure 6C:
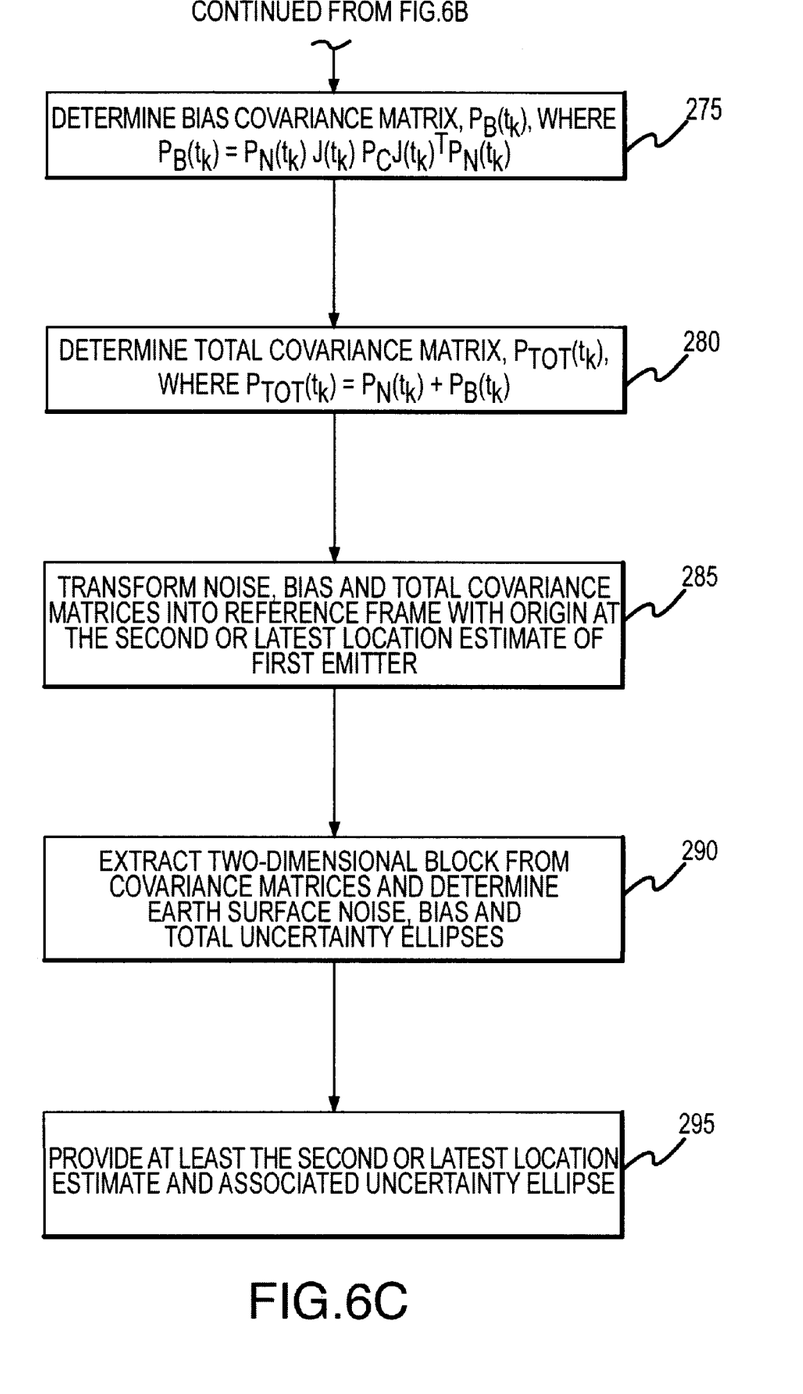

FIGS. 6A–6C illustrate another embodiment of the present invention, which utilizes a batch least squares methodology to provide geolocation information for a first emitter. In particular and referring to FIGS. 6A–6C, the method 210 includes the step 215 of assembling a bias source uncertainty matrix, $P_C$, which includes the statistics for the expected size of the bias source uncertainties (e.g., time of arrival ("TOA") bias uncertainties arising from sensor group delay uncertainty and tropospheric propagation uncertainty, AOA uncertainty arising from boresight pointing angle uncertainty and direct AOA measurement bias uncertainty, and altitude estimation bias uncertainty and platform position bias uncertainty, which contribute to both TOA and AOA uncertainty). The method 210 further includes the step 220 of receiving a first location estimate or initial location guess for the first emitter, and the step 225 of receiving a first measurement set corresponding to at least a first signal received from the first emitter. As noted hereinabove, the first measurement set may include AOA, TDOA and/or altitude information. The method 210 of the present invention further includes the step 230 of determining or computing an inverse of the matrix corresponding to the noise uncertainty for the first measurement set. Such noise measurement covariance matrix "R" for a measurement set at "t" is composed of random uncertainties at "$t_k$" in the angle of arrival, time difference of arrival, and altitude measurements in the measurement set. In this embodiment, the method 210 further includes a step 235 of determining or computing a matrix "H" of partial derivatives of at least the first measurement set with respect to emitter location (and with respect to TDOA biases, if clock offsets are included in the state solution, "$x^+$"), evaluated at the current or latest estimated emitter position (e.g., the first location estimate, and further iterative estimates). In this regard, the step 235 of determining the "H" matrix is designed to provide sensitivities of the measurements in the measurement set to changes in the location guess or estimate. Also computed are the sensitivities of the measurements with respect to the new clock offset bias unknowns, if they are included in the state solution, "$x^+$". For purposes of providing sensitivity of the measurements in relation to the size of the biases, the method 210 further includes a step 240 of determining or computing a matrix "$H_c$", which is a matrix of partial derivatives of the measurements with respect to bias error sources, evaluated at the latest or current estimated emitter position. The method 210 further includes a step 245 of adding each measurement set's contribution to an accumulated information matrix, "L", where:

L=L+$H^T R^-H$, where $H^T$ is the transpose of the matrix "H."

The method 210 also includes the step 250 of adding the latest contribution to the accumulated matrix "J", where:

J=J+$H^T R^- H_c$.

The step 250 of adding the latest contribution to accumulated matrix, "J," maps the measurement bias source uncertainty into an estimate of the influence of bias sources on estimated emitter position. Similarly, the step 245 maps the noise uncertainty in the measurements into an estimate of the influence of random measurement error on position. The method 210 further includes the step 255 of determining a vector "dz" of measurement residuals. In this regard, the step 255 of determining the vector "dz($t_k$)" computes the measurement residual, which is the difference between the actual measurement set and the measurements expected from the location guess (e.g., the latest estimated location of the emitter). If they are included in the state solution, "$x^+$", the latest clock offset bias estimates are subtracted from measured TDOA values to provide TDOA calibration, and the resulting calibrated measured TDOA values provide a better measurement residual "dz" than would have been obtained had there been no TDOA calibration. Given this residual and the sensitivities of the measurements to changes in location, a location correction can be estimated such that the corrected location will provide less measurement residual. The method 210 further includes the step 260 of adding the latest contribution to an accumulated matrix "m", where:

m=m+$H^T R^{-1} dz$, whereby "m" may be used to obtain a state vector correction.

The batch nature of the method 210 of the present invention is expressed, for example, in FIG. 3A by utilizing additional measurement sets to accumulate matrices so that new location estimates or guesses will be optimal for all available measurements. In this regard, if additional measurement sets are available, the method 210 involves repeating the above-described steps, starting at the step 230 of determining the matrix inverse of "R." In the event there are no additional measurement sets, the method 210 further includes the step 265 of inverting the information matrix "L" to obtain a noise covariance matrix, "$P_n$" to provide the random component of location uncertainty. Thereafter, the method 210 includes the step 270 of updating the location estimate "$x^+$" to reflect the latest measurement cut or set, where:

$x^+$=$x^+$$^1$m.

If the location update iteration is converged, meaning the state correction, "$L^{-1}m$", is below a selected tolerance, the method further includes the step 275 of determining or computing a bias covariance matrix, "$P_B$" where:

$P_B$=$P_N J P_c J^T P_N$.

In the event the location update iteration is not converged, the method involves repeating the method, starting with the step 230 of determining the matrix inverse of noise uncertainty. The remaining steps of the method 210, including the steps 280 of determining a total covariance matrix "$P_{TOT}$", the step 285 of transforming the noise, bias and total covariance matrices into a reference frame with an origin at the estimated emitter location (e.g., second location estimate of the first emitter), and the step 290 of extracting a two-dimensional block from the covariance matrices and determining earth surface noise, bias and total uncertainty ellipses, are designed to express the total location uncertainty as an uncertainty ellipse centered at the updated location guess (e.g., second location estimate) of the first emitter. The total uncertainty corresponds to the sum of the random and bias uncertainty matrices at step 280. Since the steps of the present method are performed in a reference frame which is not coincident with the second or latest location estimate, the uncertainty must be transformed to a frame with an origin at the updated or latest location guess (e.g., the second location estimate). This is accomplished in step 285. Finally, in order to provide an uncertainty ellipse resting on the earth's surface, step 290 is performed. Thereafter, the method 210 includes the step 295 of providing the updated location estimate (e.g., at least the second location estimate) and associated uncertainty ellipse to a user, via, for example, a display screen or printout (e.g., map).

Figure 7A:
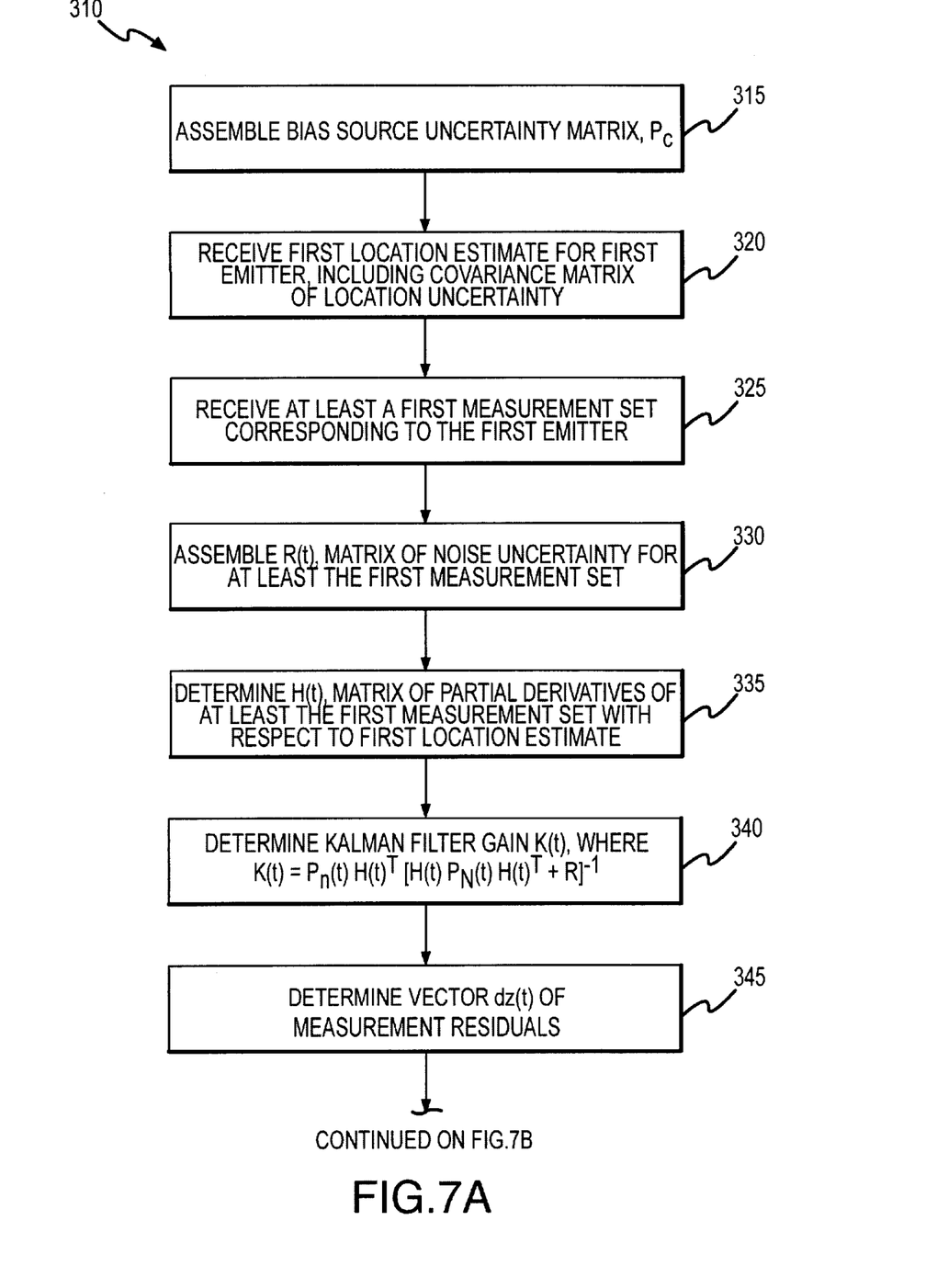
FIGS. 7A–7B illustrate still another embodiment of the method of the present invention.
Figure 7B:
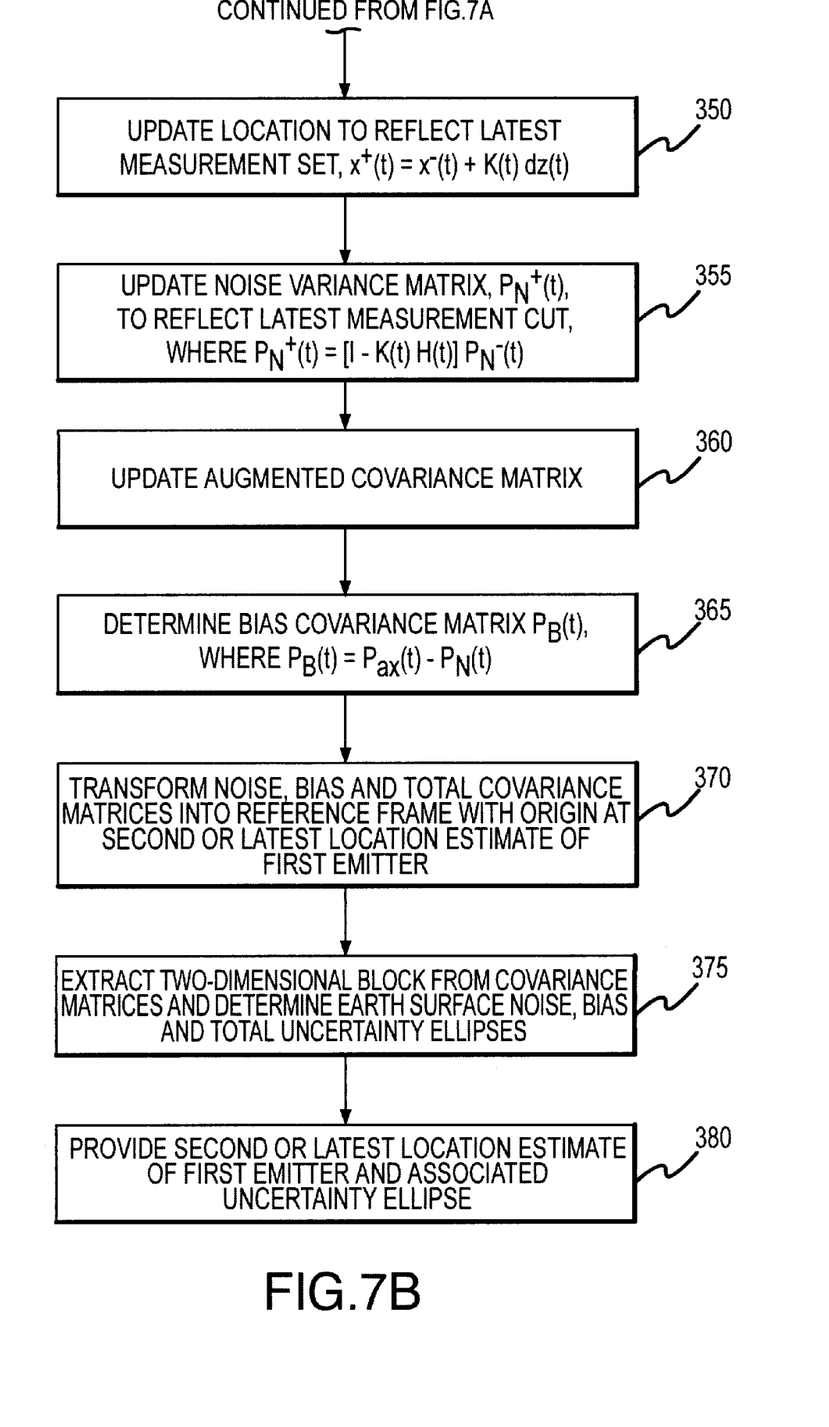

In another embodiment, illustrated in FIGS. 7A–7B, Kalman filtering is utilized to provide an estimate of the location of an emitter using a first location estimate or guess, a first measurement set including angle of arrival, time difference of arrival and/or altitude information, and a first location uncertainty (e.g., from a least squares analysis). In one embodiment, the method 310 includes the step 315 of assembling a bias source uncertainty matrix, "$P_c$." The method 310 of the present invention further includes the step 320 of receiving a first location estimate or guess for the first emitter, the first location guess provided by finding the intersection of angle of arrival measurements from at least two geometrically separated sensors or platforms at one time, the sensors receiving a first signal from the first emitter, or one sensor which moves between two different times, or one sensor at one position and time which measures both azimuth angle of arrival and elevation angle of arrival. Given the first location estimate or guess, at least one analysis by the above-described batch least squares methodology or other comparable methodology, discussed in relation to FIGS. 6A–6C, is required to obtain an uncertainty covariance matrix of the location.

In one embodiment, the first location guess or estimate is the updated location guess provided by the above-described batch least squares methodology. Unlike the batch least squares methodology described in FIGS. 6A–6C, the Kalman filter methodology is not iterative. The Kalman filter methodology simply uses a previous location estimate and uncertainty estimate, and the single latest measurement set for update. The contribution of previous measurements is reflected only through the previous location and the previous location accuracy covariance matrices. The Kalman filter methodology seeks to balance the weight of the single latest measurement against the weight of all previous measurements as it estimates a new location and location uncertainty. The main scaling parameter used for the Kalman filter analysis is the Kalman filter gain "K".

Returning to FIGS. 7A–7B, the method 310 further includes the step 325 of receiving a first measurement set corresponding to the first emitter, the first measurement set including angle of arrival, time different of arrival and/or altitude or terrain altitude information relative to the first emitter. The method 310 also includes the step 330 of assembling a matrix of noise uncertainties, "R", for the first measurement set, the step 335 of determining or computing a matrix of partial derivatives, "H", of the measurements with respect to the first location estimate or guess (and with respect to TDOA biases, if clock offsets are included in the state solution, "$x^+$") evaluated at the current or latest estimated emitter position, and with respect to TDOA biases. The method 310 further includes the step 340 of determining or computing a Kalman filter gain, "K", where:

$$K = P_N H^T [H P_N H^T + R]^{-1}.$$

Such Kalman filter gain, "K", is used in the computation of state (i.e., location and clock offsets, if included) correction and in the random and bias location uncertainty updates which will be described in more detail herein below). The inverted matrix appearing in this elation is the sum of the measurement uncertainty R assembled in step 330, and the matrix product "$H P_N H^T$", the matrix product being a mapping of the random location uncertainty "$P_N$" into a corresponding measurement uncertainty, given the sensitivities of the measurements to location estimate change, "H," computed in step 335. Thus, the sum of the matrix product and the measurement uncertainty is the total random measurement uncertainty for a given location estimate, due to both actual measurement uncertainty and uncertainty in the measurements arising from uncertainty in the location. If one thinks of the matrix inverse as a reciprocal relation, the gain K is inversely proportional to the measurement uncertainty.

That is, if the current measurement has poor accuracy, the gain and consequently the state correction and location uncertainty update will be small. In effect, the a priori location is weighted preferentially over the latest measurement set. Similarly, the gain, "K", is directly proportional to the location random uncertainty "$P_N$". This implies that a poor a priori state estimate uncertainty will produce a large gain and consequently a large state correction and a large location uncertainty update. In that case, the latest measurement set is weighted more relative to the a priori location.

The location estimate update is performed in step 350, given the Kalman gain calculated in step 340 and the measurement residuals calculated at step 345. The state residuals "dz" are the differences between the actual measurements of angle of arrival, time difference of arrival and/or altitude and the expected measurements from the estimated location and the known sensor position. As noted hereinabove with respect to another embodiment, the latest TDOA bias estimates, if included in the state solution, "$x^+$", are to provide TDOA calibration, and the resulting measured TDOA values will provide an improved measurement residual "dz". The Kalman gain maps these residuals into a corresponding state correction. If the expected measurements agree well with the actual measurements, then the state correction is small. Next, the method 310 includes a step 355 of updating the noise variance matrix $P_N^+$, to reflect this measurement set or cut, where:

$P_N^+ = [I - KH] P_N^-$, where "I" is the identity matrix.

Thereafter the method 310 includes the step 360 of updating the bias augmented covariance matrix:

$$\begin{bmatrix} P_{ax}^+(t) & P_{axc}^+(t) \\ P_{acx}^+(t) & P_c^+ \end{bmatrix} = \begin{bmatrix} I - K(t)H(t) & -K(t)H_c(t) \\ 0 & I \end{bmatrix} \begin{bmatrix} P_{ax}^-(t) & P_{axc}^-(t) \\ P_{acx}^-(t) & P_c^- \end{bmatrix}$$

$$\begin{bmatrix} (I - K(t)H(t))^T & 0 \\ (-K(t)H_c(t))^T & I \end{bmatrix} + \begin{bmatrix} K(t)R(t)K(t)^T & 0 \\ 0 & 0 \end{bmatrix}$$

The step 360 is a block matrix update relation for total location uncertainty, "$P_{ax}$", where:

$P_{ax} = P_N + P_B$

Such block matrix update is derived from considering the expected value of the total errors associated with the state noise and the state bias, and uses quantities from some of the above-identified steps to get a total location uncertainty. The next three steps, steps 365, 370 and 375, are designed to express the total location uncertainty as an uncertainty ellipse centered at the updated location guess (e.g., a second location estimate). The bias uncertainty is the difference between the total and noise uncertainty matrices, and is determined at step 365. Since the above steps are performed in a reference frame which is not coincident with the location estimate, the uncertainty must be transformed into a frame with origin at the updated or second location guess. This is accomplished at step 370, of transforming noise, bias and total covariance matrices into the reference frame with an origin at the second location estimate. Next, the method includes the step 375 of getting a two-dimensional uncertainty resting on the earth's surface. This is accomplished by extracting a two-dimensional block from the covariance matrices and determining earth surface noise, bias and total uncertainty ellipses. Thereafter, the method includes the step 380 in providing the updated or second location estimate of the first emitter and associated uncertainty ellipse to a user, via for example, a display screen or printout (e.g., map).

The foregoing description of the invention has been presented for purposes of illustration and description.

Furthermore, the description is not intended to limit the invention to the form disclosed herein. Consequently, variations and modifications consistent with the above teachings and with the skill or knowledge of the relevant art are within the scope of the present invention. The embodiments described hereinabove are further intended to explain the best modes known for practicing the invention and to enable other skilled in the art to utilize the invention in such, or, other embodiments and with various modifications required by the particular applications or uses of the present invention. It is intended that the appended claims should be construed to include alternative embodiments to the extent permitted by the prior art.

What is claimed is:

1. A method for locating a first emitter comprising the steps of:
    receiving at a first platform and a second platform at a first point in time a first signal from the first emitter;
    determining at least one of a first angle of arrival and a first time of arrival of the first signal at the first platform at the first point in time;
    determining at least one of a second angle of arrival and a second time of arrival of the first signal at the second platform at the first point in time;
    receiving a first altitude estimate for the first emitter, wherein the first altitude estimate is an estimate of an altitude of the first emitter in relation to a predetermined altitude reference;
    determining a first location estimate of the first emitter using said first altitude estimate for the first emitter and at least one of the first angle of arrival and the first time of arrival of the first signal at the first platform at the first point in time and said at least one of the second angle of arrival and the second time of arrival of the first signal at the second platform at the first point in time.

2. A method as claimed in claim 1, wherein said first altitude estimate is independent of said first and second angles of arrival.

3. A method as claimed in claim 1, wherein said receiving the first altitude estimate comprises the step of:
    determining a coarse location estimate of the first emitter;
    retrieving the first altitude estimate from a terrain database based on the first course location estimate.

4. A method as claimed in claim 1, further comprising the steps of:
    receiving at the first and second platforms a second signal from the first emitter, the second signal different from the first signal;
    determining at least one of a first angle of arrival and a first time of arrival of the second signal at the first platform;
    determining at least one of a second angle of arrival and a second time of arrival of the second signal at the second platform;
    determining a second location estimate of the first emitter using said at least one of the first angle of arrival and the first time of arrival of the second signal at the first platform, said at least one of the second angle of arrival and the second time of arrival of the second signal at the second platform and said first location estimate.

5. A method as claimed in claim 1, wherein said determining said first location estimate step comprises performing one of a least squares analysis and a Kalman filter analysis using said at least one of the first angle of arrival and the first time of arrival of the first signal at the first platform and said at least one of the second angle of arrival and the second time of arrival of the first signal at the second platform.

6. A method as claimed in claim 1, further comprising the step of:
    receiving an initial location estimate for the first emitter.

7. A method as claimed in claim 6, wherein said determining said first location estimate step further comprises using said initial location estimate.

8. A method as claimed in claim 6, wherein said receiving said initial location estimate step comprises performing one of the steps of:
    determining said initial location from a first intersection of said first and second angles of arrival of said first signal at the first and second platforms, respectively, the first platform being remote from the second platform;
    determining said initial location from a second intersection of said first angle of arrival and a third angle of arrival of said first signal at the first platform and a third platform, respectively, the first platform being remote from the third platform;
    determining said initial location from a third intersection of said third angle of arrival and a fourth angle of arrival of said first signal at the third platform and a fourth platform, respectively; and
    determining said initial location from first and second azimuths of first and second angles of arrival of said first signal at the third platform at first and second times, respectively.

9. A method as claimed in claim 6, wherein said receiving said initial location estimate step comprises performing one of the steps of:
    determining said initial location from a first intersection of said first angle of arrival and a second angle of arrival of said first signal at the first and second platforms;
    determining said initial location from a second intersection of a first angle of arrival and a second angle of arrival of said first signal at a third platform; and
    determining said initial location from a third intersection of a third and a fourth angle of arrival of said first signal at the third and a fourth platform.

10. A method as claimed in claim 6, wherein said receiving said initial location estimate comprises performing one of the steps of:
    determining said initial location from a first intersection of a first pointing direction with a ground surface, said first pointing direction corresponding to a first azimuth and a first elevation of said first angle of arrival of said first signal at the first platform; and
    determining said initial location from a second intersection of a second pointing direction with the ground surface, said second pointing direction corresponding to a first azimuth and a first elevation of a third angle of arrival of said first signal at a third platform.

11. A method as claimed in claim 10, wherein, said predetermined altitide reference is sea level.

12. A method for locating a first emitter comprising the steps of:
    receiving an initial location estimate of the first emitter;
    receiving a first altitude estimate of the first emitter, wherein the first altitude estimate is an estimate of an altitude of the first emitter above sea level in relation to a predetermined altitude reference;

receiving at a first platform and a second platform at a first point in time a first signal from the first emitter;

determining a first time difference of arrival of the first signal at the first and second platforms at the first point in time;

determining a first location estimate of the first emitter using said first time difference of arrival of the first signal at the first and second platforms at the first point in time, said inital location of the first emitter and said first altitude estimate of the first emitter.

13. A method as claimed in claim 12, further comprising the steps of:

receiving at least one of the first and second platforms a first angle of arrival and a second angle of arrival of the first signal from the first emitter.

14. A method as claimed in claim 13, wherein said first and second angles of arrival are received at the first and second platforms, respectively, wherein said first and second angles of arrival are used in said determining said first location estimate step.

15. A method as claimed in claim 13, wherein said receiving said initial location estimate comprises the step of:

determining said initial location estimate using said first and second angles of arrival of the first signal from the first emitter.

16. A method as claimed in claim 12, wherein said determining said first location estimate comprises performing one of a least squares analysis and a Kalman filter analysis using said first time difference of arrival of the first signal at the first and second platforms, said initial location of the first emitter and said first altitude estimate of the first emitter.

17. A method as claimed in claim 12, wherein said determining said first location estimate comprises performing a least squares analysis using said first time difference of arrival of the first signal at the first and second platforms, said initial location of the first emitter and said first altitude estimate of the first emitter, said method further comprising the steps of:

receiving at two of the first platform, the second platform, a third platform and a fourth platform a second signal from the first emitter;

determining a second time difference of arrival of the second signal at said two of the first, second, third and fourth platforms; and determining a second location estimate of the first emitter, said determining said second location step comprising the step of performing a Kalman filter analysis using at least one of said first location estimate, said second time difference of arrival of the second signal at said two of the first, second, third and fourth platforms, said initial location of the first emitter and said first altitude estimate of the first emitter.

18. A method as claimed in claim 17, further comprising the step of determining a first location uncertainty, wherein said performing said Kalman filter step further includes using said first location uncertainty.

19. A method as claimed in claim 12, further comprising:

retrieving said first altitude estimate from a terrain database based on the first location estimate.

20. A method as claimed in claim 12, wherein said predetermined altitude reference is sea level.

* * * * *

UNITED STATES PATENT AND TRADEMARK OFFICE
CERTIFICATE OF CORRECTION

PATENT NO.    : 6,407,703 B1
DATED         : June 18, 2002
INVENTOR(S)   : Minter et al.

It is certified that error appears in the above-identified patent and that said Letters Patent is hereby corrected as shown below:

Column 10,
Line 60, delete "altitide", and insert therefor -- altitude --;
Line 66, delete "above sea level";

Column 11,
Line 9, delete "inital", and insert therefor -- initial --.

Signed and Sealed this

Twenty-eighth Day of January, 2003

JAMES E. ROGAN
*Director of the United States Patent and Trademark Office*